US009439085B2

(12) United States Patent
Kenington et al.

(10) Patent No.: US 9,439,085 B2
(45) Date of Patent: Sep. 6, 2016

(54) GEOLOCATION DATA PRIORITIZATION SYSTEM

(75) Inventors: Peter Kenington, Chepstow (GB); Nicholas James Randell, Alton (GB); Michael Joseph Flanagan, Chester, NJ (US)

(73) Assignee: Viavi Solutions UK Limited, Berkshire (GB)

(*) Notice: Subject to any disclaimer, the term of this patent is extended or adjusted under 35 U.S.C. 154(b) by 0 days.

(21) Appl. No.: 13/293,564

(22) Filed: Nov. 10, 2011

(65) Prior Publication Data

US 2013/0122926 A1 May 16, 2013

(51) Int. Cl.
*H04W 24/04* (2009.01)
*H04W 8/08* (2009.01)
*H04W 24/08* (2009.01)

(52) U.S. Cl.
CPC ............... *H04W 24/04* (2013.01); *H04W 8/08* (2013.01); *H04W 24/08* (2013.01)

(58) Field of Classification Search
CPC ...... H04W 24/04; H04W 8/08; H04W 24/08
USPC ........ 455/423, 456.1–456.6, 9, 226.1, 414.1, 455/410, 456.5, 405, 422.1, 466, 435.1, 455/512, 556.1
See application file for complete search history.

(56) References Cited

U.S. PATENT DOCUMENTS

| | | | | |
|---|---|---|---|---|
| 8,077,675 B2* | 12/2011 | Stephenson | ........... | H04W 24/08 370/331 |
| 8,244,206 B1* | 8/2012 | Hines et al. | ............... | 455/404.2 |
| 8,538,428 B2* | 9/2013 | Bartlett | ................. | H04W 24/10 455/423 |
| 2004/0038687 A1 | 2/2004 | Nelson | | |
| 2006/0258339 A1* | 11/2006 | Connelly | .............. | H04M 15/41 455/414.1 |
| 2007/0117573 A1 | 5/2007 | Kennedy, Jr. et al. | | |
| 2009/0075648 A1* | 3/2009 | Reed | ................... | H04L 41/0816 455/424 |
| 2009/0075655 A1 | 3/2009 | Dobson et al. | | |
| 2009/0323530 A1* | 12/2009 | Trigui | ................. | H04L 41/5025 370/235 |

(Continued)

FOREIGN PATENT DOCUMENTS

GB 2426155 A 11/2006
GB 2452796 A 3/2009

(Continued)

OTHER PUBLICATIONS

Great Britain Search Report, Application No. GB1119400.8, filed Mar. 12, 2012. (4 pages).

(Continued)

*Primary Examiner* — Khawar Iqbal
(74) *Attorney, Agent, or Firm* — Harrity & Harrity, LLP

(57) ABSTRACT

Communication session data from a mobile radio communications network (100) is processed to extract substantially all communication session data relating to calls in at least two sectors of the network. This processing occurs as the communication session data becomes available, thereby providing a stream of communication session data (210). From the stream of communication session data (210), a high priority data stream (220) is created. The high priority data steam (220) comprises a minority of the communication session data for each call in the at least two sectors of the network (100). Geolocation data (230) is produced for each call. An immediately accessible copy of both the high priority data stream (220) and the geolocation data (230) is provided, for each call.

19 Claims, 6 Drawing Sheets

(56) References Cited

U.S. PATENT DOCUMENTS

| | | | |
|---|---|---|---|
| 2010/0085918 A1 | 4/2010 | Dantuluri et al. | |
| 2010/0226339 A1* | 9/2010 | Stephenson et al. | 370/332 |
| 2011/0130135 A1* | 6/2011 | Trigui | H04W 24/08 455/423 |
| 2011/0151839 A1* | 6/2011 | Bolon | H04W 24/08 455/414.1 |
| 2011/0205125 A1* | 8/2011 | Lin | G01S 5/0236 342/451 |
| 2012/0021772 A1* | 1/2012 | Drennan | H04W 4/02 455/456.3 |
| 2012/0196618 A1* | 8/2012 | Lowell | H04W 24/08 455/456.1 |
| 2013/0122855 A1* | 5/2013 | Kenington | H04W 24/08 455/405 |
| 2013/0122925 A1* | 5/2013 | Flanagan | H04W 24/08 455/456.1 |
| 2013/0122940 A1* | 5/2013 | Kenington | H04L 67/1002 455/456.5 |
| 2013/0322274 A1* | 12/2013 | Zakrzewski | H04W 28/021 370/252 |

FOREIGN PATENT DOCUMENTS

| | | |
|---|---|---|
| JP | 2005094634 A | 4/2005 |
| WO | 2005029892 A1 | 3/2005 |
| WO | 2007022540 A1 | 2/2007 |
| WO | 2009034367 A1 | 3/2009 |
| WO | 2009034391 A1 | 3/2009 |
| WO | 2010081658 A2 | 7/2010 |
| WO | 2011068583 A1 | 6/2011 |

OTHER PUBLICATIONS

PCT International Search Report and The Written Opinion of counterpart PCT Application PCT/EP2012/072310 issued by the International Searching Authority dated Feb. 7, 2013.

EP Communication corresponding to 12 798 172.8, mailed Aug. 14, 2015, 7 pages.

* cited by examiner

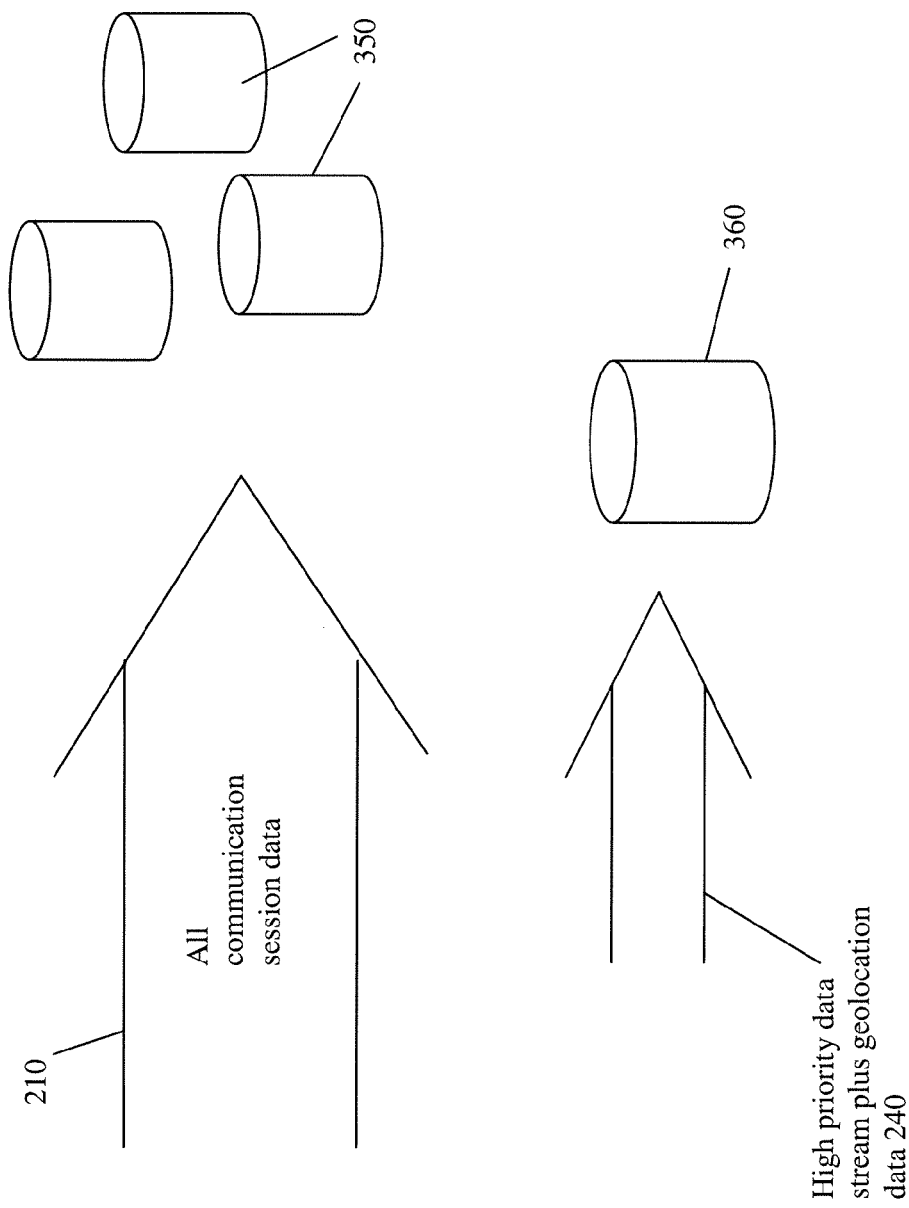

| Type of information | Example/comment |
|---|---|
| Call connection setup information | This may include:<br>(i) The fact that a new voice or data call has been set up; and<br>(ii) The time at which it was set up. |
| Call closedown information | This may include:<br>(i) The fact that a voice or data call has been closed down;<br>(ii) The time at which this happened; and<br>(iii) The reason why the call closed down, i.e. was it closed down intentionally by the user, or prematurely due to a problem in/with the network. |
| Identification of the radio links involved in the call | This provides information about the base-stations to which the call is connected. |
| Measured radio propagation delay | This is the propagation delay measured for signals passing from the base-station to the handset, or vice versa. |
| The radio bearer or bearers involved during the call | The radio bearer(s) may be, for example, 3G, HSPA, HSPA+ etc. More than one may be involved, for example during a video-conferencing call. |
| The type of call | Examples of call types are: voice, data, SMS, MMS etc |
| Measurement reports | Measurement reports may provide information on:<br>(i) Cell sites that are visible to the user's terminal<br>(ii) Timing values. These may be offsets from the user-terminal's master clock at which the base-station's signals are seen. These may be used to determine the terminal's geographic location. |
| RCSP | The RCSP is effectively the received signal strength and signal-to-noise ratio, in the form of Ec/No. |
| Subscriber information | This may comprise the IMSI and IMEI. However, the user's identity is not known, since it is not known by the network. |

Fig. 4

GEOLOCATION DATA PRIORITIZATION SYSTEM

FIELD OF THE INVENTION

The field of the invention relates to a geolocation data prioritisation system. The system may be used to process data relating to communications made in a wireless mobile communication system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. Calls may be data, video, or voice calls, or a combination of these. Such macro cells utilise high power base stations to communicate with wireless communication units within a relatively large geographical coverage area. The coverage area may be several square kilometers, or larger if it is not in a built-up area.

Typically, mobile communication units, or User Equipment as they are often referred to in 3G, communicate with a Core Network of the 3G wireless communication system. This communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell. Each base station may have multiple antennas, each of which serves one sector of the cell.

Operators of wireless communication systems need to know what is happening in the system, with as much precision as possible. A particular issue is the need to solve 'faults'. Faults may take a wide variety of forms, but can be summarised as events when the network and/or one or more mobile communication units do not perform as expected.

Modern wireless communication systems allow a high degree of autonomy to individual mobile communication units and to base stations. As a consequence, decisions about setting up and 'tearing down' call links throughout the network are not all made centrally. An additional complication arises from the volume of information generated within the wireless communication system. In one day, a wireless communication system may generate 100 gigabytes of data about calls that have been made in the network.

This volume of data has proved a major obstacle to fault location in existing wireless communication systems. Network operators have not been able to install sufficiently large memories to store this information, with acceptable access times.

Some conventional systems do store all data generated in a network, using expensive storage technology. These approaches then involve attempting to access one or more individual records, as and when an enquiry about a particular mobile communication unit or call is received.

Three other conventional approaches to finding out what has happened in the network do not rely on storing all data from the mobile radio communications network. These approaches are referred to under separate sub-headings below as 'Approach 1', 'Approach 2' and 'Approach 3'.

Approach 1

A user of a mobile communication unit may notify the network operator of a fault. In this case, staff at the network operator's operations centre will typically arrange for data to be captured for a limited part of the network, for a limited time period. For example, the wireless communication network may be 'probed', to collect data. The probe may be installed in the wireless communication network for a period of up to 24 hours, typically, and monitor one sector of the network. Even though data is only gathered comprehensively for a very limited part of the wireless communication network, for only a few hours, the volume of data collected is still very great.

The data is typically analysed as a batch, after the end of the monitoring period. Expert staff may be required to interpret the results. If particular additional calculations often need to be performed, such as 'geolocating' a mobile communication device, then this may add to the total delay.

There are many disadvantages of this approach, including that:

(i) The results are often first available more than a day after a fault has been reported.
(ii) The fault may only be detected if it re-occurs during the period for which the probe is gathering data.
(iii) The fault may only be detected if the probe has been installed in the correct sector of the network.
(iv) There is significant scope for operator error.

Approach 2

Some network operators try to derive high level statistics for the operation of their network. A typical approach is to take a small sample of the calls occurring, across multiple sectors or the whole network. If the sample is large enough, then a representative sample of calls for most or all sectors will be available. These can then be used to develop indicators of what is happening in the network.

For example, it may be possible to say what percentage of the calls of the sample for a given sector were 'dropped'. 'Dropped' calls are calls that did not end with termination by either participant in the call, but by the network or one mobile communication unit being no longer able to maintain the communication link. So a network operator may know, in this example, that 2% of the sample of calls in a particular sector were dropped, in a given time period. From this, if the sample was large enough, it may be reasonable to infer that 2% of all the calls that actually took place, were dropped. This may be of use in indicating that one sector has a higher rate of dropped calls than the mean rate for other sectors. However, such information is only an indication that there may be some kind of problem in a sector. This does not help diagnose why a particular user is reporting faults.

The statistics that can be produced often do not provide fine enough detail for a network operator to derive reliable fault diagnosis information. For example, if an antenna covering a particular sector is not at the optimal angle, this may not be revealed. If a particular class of mobile communications unit, such as a new design of smartphone, is not operating reliably within the sector, then the operator may not have the evidence to demonstrate this.

Approach 3

Network operators conduct 'drive tests' through a network. A vehicle is driven through the mobile communications network, and parameters such as signal strength are measured at the various locations that the vehicle can access. This approach may be undertaken routinely, or may be instigated after approaches 1 or 2 indicate that there may be a problem in a sector.

A growing proportion of calls are now being made within buildings. However, vehicles are restricted to roads and parking areas, so drive tests cannot provide information about why a user within a building experiences a fault. In addition, drive tests are likely to occur even later than the monitoring described under approach 1, so may involve even more days of delay, before a fault can be diagnosed.

SUMMARY OF THE INVENTION

Accordingly, the invention seeks to mitigate, alleviate or eliminate one or more of the abovementioned disadvantages singly or in any combination. The invention may process all call session data from at least two sectors of a network, at all times. A prioritised data stream is created as communication session data becomes available from the network. This leads to near real-time availability of a copy of both the high priority data stream and geolocation data for each call.

BRIEF DESCRIPTION OF THE DRAWINGS

Embodiments of the invention will be described, by way of example only, with reference to the accompanying drawings, in which:

FIG. 3 is a schematic diagram, illustrating a possible storage arrangement.

FIG. 4 is a table, showing communication session data for a call that may be extracted from a mobile radio communications network.

DETAILED DESCRIPTION OF EMBODIMENTS OF THE INVENTION

Figure 1:
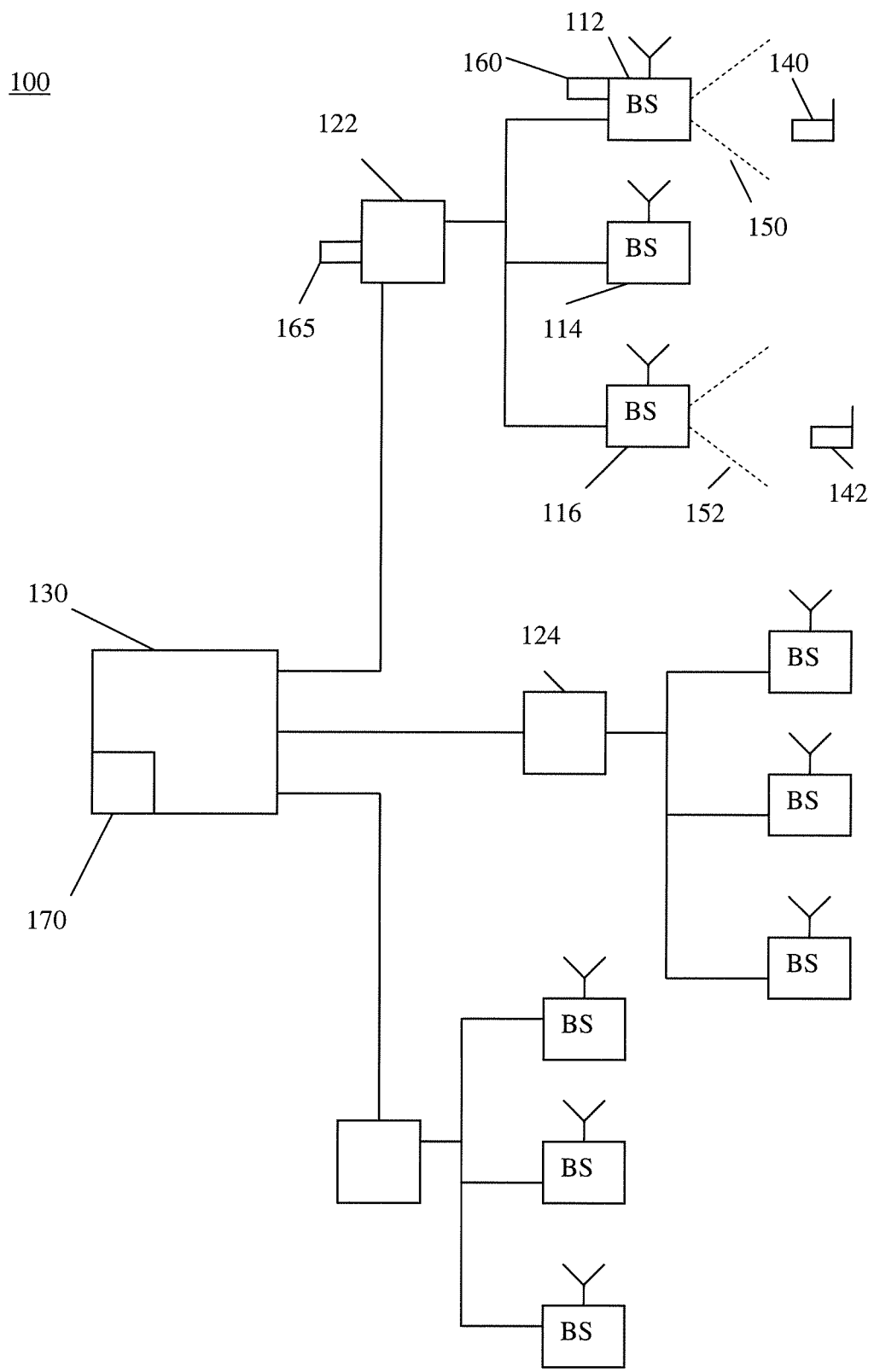
FIG. 1 is a schematic representation of a mobile radio communications network, showing some elements of embodiments of the invention.

Examples of the invention will be described in terms of a system and a method for processing communication session data from a mobile radio communications network.

The method of the invention comprises the following steps (i)-(iii):
(i) Extracting substantially all communication session data relating to calls in at least two sectors of the mobile radio communications network. The communication session data is extracted as it becomes available. Data availability depends on the particular design of the mobile radio communications network. However, typically, communication session data may be available every fifteen minutes or less from e.g. the call processing units of the mobile radio communications network. This extraction step provides a stream of communication session data.
(ii) Creating a 'high priority' data stream from the stream of communication session data. The exact selection of high priority data may depend on the full set of parameters that is available for each call, from the particular design of network. However, the high priority data will comprise a minority of the communication session data provided by the mobile radio communications network for each call in the at least two sectors, but does contain data for each call.
(iii) Processing the high priority data stream in real-time. The high priority data steam is processed to produce geolocation data for each call. In addition, this processing provides an immediately accessible copy of both the high priority data stream and the geolocation data for each call.

Aspects (i)-(iii) have re-defined the task of providing information that may be valuable in fault finding. Firstly, all calls in at least two sectors of the network provide call session data, rather than just calls from one sector of the network as described in approach 1 of the background section. Approach 2 described in the background section only took a small percentage of the calls from multiple sectors, so likewise did not take all calls. Secondly, the method of the invention does not rely on the batch processing used in approach 1, with the delay that batch processing entails. It also does not involve the delay inherent in selecting a sector for probing, in the hope that a fault will re-occur, as is the case with approach 1.

With steps (i)-(iii) of the invention described above, the resulting data, including geolocation data, may be available less than an hour after any particular call was placed in the network. The exact delay will vary, for example with the time of day. At very quiet periods such as at night, data may be available almost instantaneously.

Such rapid availability of data on all calls within at least two sectors means that:
(i) The operator may detect faults, even before a mobile communication unit's user has reported them.
(ii) If a fault occurs only intermittently, it may be detected the first time that it occurs. This avoids repeated attempts using approaches 2 and 3 described in the background section, waiting for re-occurrence of a fault.
(iii) Some problems in the network itself, such as a faulty antenna pointing angle, may be corrected within hours of the fault arising. This eliminates many fault reports that otherwise would have been received subsequently, from users. Thus the invention may cut down on the total number of fault reports received from users in a given time period.

FIG. 1 illustrates some aspects of the invention. FIG. 1 is a schematic representation of a mobile radio communications network 100.

Network 100 comprises a very large number of base stations, of which only first base station 112, second base station 114, and third base station 116 have reference numbers assigned.

First call processor 122 and second call processor 124 are connected to the base stations. Each call processor may be connected to ten or more base stations. In a 3G network, the call processors may be 'Radio Network Controllers', which are often referred to simply as RNCs.

A master control processor 130 may be connected to all of the call processors. In a 3G network, the master control processor may be the Operational Support System, which is often known as the 'OSS'.

At the right edge of FIG. 1, first mobile communication unit 140 and second mobile communication unit 142 are shown. First mobile communication unit 140 is supported by a first sector 150 of first base station 112. Second mobile communication unit 142 is supported by a second sector 152 of third base station 116. The first and second mobile communication units may be in communication with each other through the network, or with other mobile communication units with other communication networks not shown in FIG. 1. Either or both of the first 140 and second 142 communication units may be faulty, or may suffer poor service due to a fault or poor coverage availability in the mobile radio communications network.

FIG. 1 shows three points at which communication session data may be collected, in accordance with various embodiments of the invention.

The first point is indicated by first probe 160 attached to first base station 112. Other probes may be attached to some or all of the other base stations.

The second point is shown by second probe 165 attached to first call processor 122. Other probes may be attached to some or all of the other call processors.

The third point is shown by internal module 170 of master control processor 130. Internal module 170 may be configured to collect call session data about all or some of the sectors of the network. If internal module 170 collects call session data from the whole of network 100, then in such an embodiment, it may not be necessary to install any of the first or second probes.

In one embodiment of the network, second probe 165 may be attached to first call processor 122 externally, and tap into call session data passing to or from first call processor 122. Alternatively, second probe 165 may be integrated into the first call processor 122, and receive a feed of call session data processed within first call processor 122.

With the arrangement of FIG. 1, substantially all communication session data may be obtained from internal module 170. Alternatively, substantially all communication session data may be obtained from probes such as first probe 160, provided at all the base stations. Alternatively, substantially all communication session data may be obtained from probes such as second probe 165, provided at all the call processors. As a further alternative, communication session data may be obtained from parts of the network 100 using probes such as first probe 160, and from other parts of the network using probes such as second probe 165.

Although FIG. 1 describes an embodiment in which call session data is collected from the whole of network 100, the invention may be applied to the processing of data obtained from as few as two sectors of the network. In its simplest form, therefore, only two of the first probes 160 may be needed, or only data for at least two sectors need be obtained from a second probe 165 or module 170. However, the advantages of the invention relative to conventional approaches 1-3 described in the background section may be greater, the greater the number of sectors to which the invention is applied.

Figure 2:
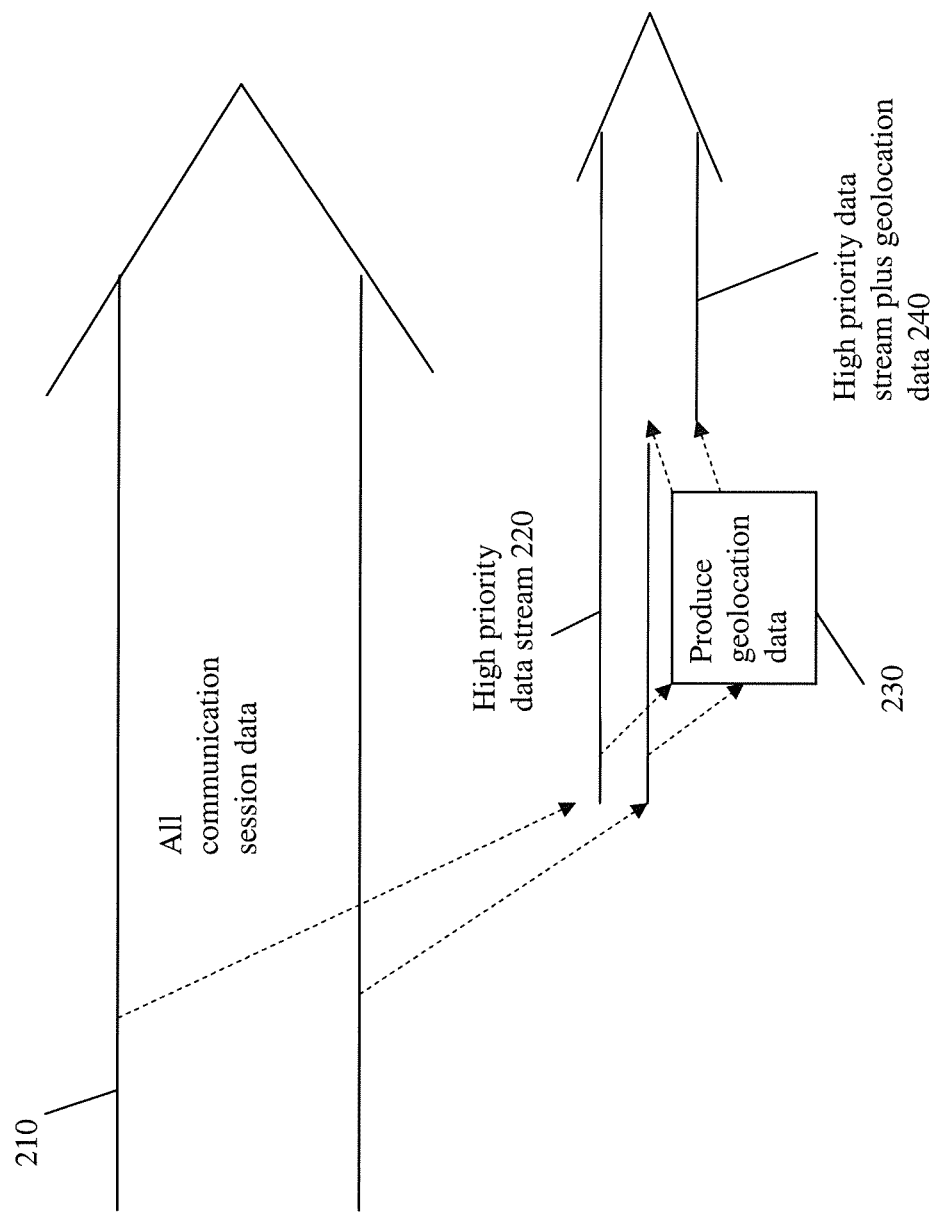
FIG. 2 is a schematic diagram of schematic diagram of a flow of data.

FIG. 2 is a schematic diagram of a flow of communication session data in accordance with a method and system of the invention. FIG. 2 generally indicates a flow of information with time, from left to right across the page.

Data stream 210 represents raw communication session data from the mobile radio communications network 100. The width of the data stream, from top to bottom of the arrow 210 shown on FIG. 2, indicates generally the large volume of data extracted from the network per unit time.

High priority data stream 220 is shown as being of substantially lower width than data stream 210. This illustrates the lower volume of data in high priority data stream 220, per unit time. Data stream 220 may, for example, comprise only 10% or less of the rate of flow in data stream 210.

Module 230 on FIG. 2 is the only functional module shown on FIG. 3. Module 230 represents the real time processing of high priority data stream 220, to provide geolocation data. As shown to the right of module 230, the geolocation data is then available together with high priority data stream 220. The combined data streams are indicated by the 'high priority data stream plus geolocation data' 240.

Module 230 may also prepare other information, on the basis of the high priority data stream 220. For example, module 230 may provide quality of service information, either on a per call level, or for more than one call. Module 230 may also prepare such information as larger scale quality of service or coverage maps. This additional information is not shown on FIG. 3, in order to keep FIG. 3 uncluttered. However, such additional information provided by module 230 may be added to the 'high priority data stream plus geolocation data' 240. Thus quality of service data for at least two sectors of a mobile radio communications network may be provided. An immediately accessible copy of quality of service data maybe provided, together with the copies of the high priority data and geolocation data.

Reviewing FIGS. 1 and 2 together, it is clear that the data extraction of FIG. 1 and prioritisation of FIG. 2 may continue indefinitely. This is in contrast to time limited data gathering, such as in approach 1 described in the background section.

FIG. 3 shows schematically a possible storage arrangement, that may be employed with embodiments of the invention.

FIG. 3 repeats data stream 210 and the 'high priority data stream plus geolocation data' 240, from FIG. 2.

Data stream 210 may or may not be stored. Storage areas 350 are shown as possible storage areas. If data stream 210 is retained in storage 350, then the likelihood that any particular record will be retrieved may be significantly less than 1 in a million. The records may be stored in large data stores 350, which do not offer high speed access. Alternatively, data steam 210 of FIG. 2 may simply be discarded of deleted. This may occur either after the creation of high priority data stream 220, or after the successful provision of an immediately accessible copy of both the high priority data stream and the geolocation data for each call.

The high priority data stream and geolocation data stream 240 is converted to a format in which the copies are immediately accessible. An immediately accessible copy of both the high priority data stream and the geolocation data for each call may be created in priority storage area 360. Although shown as a single store in FIG. 3, it is possible that priority storage area 360 may be constructed as two or more physical units. The defining characteristics of priority storage area 360 are, however, that its contents are rapidly accessible, and it is significantly smaller than a memory such as storage area 350 that would be necessary to store of communication session data stream 210, for any given period.

Both the high priority data stream and the geolocation data for each call may then be accessed by network management staff working for the operator of the mobile radio communications network. Priority storage area 360 is provided by a storage area with a very low access time. Once data has been loaded into priority data store 360, network management staff will be able to access information from it as quickly as from other types of local database. It will be immediately accessible data. However, it may still take up to an hour between a call being placed in network 100, the priority data stream 220 being created, and copies stored in priority storage area 360. Also, in some embodiments, remote access may be provided to priority storage area 360.

Priority storage area 360 may only acquire new data at typically one tenth the rate that data will accumulate in storage areas 350, if provided. The immediately accessible copy of the high priority data stream and the geolocation data for each call may, together, typically occupy less than 10% of the storage space needed for the communication session data for the corresponding call.

Although not shown in FIG. 3, information may be supplied to priority storage area 360 concerning the configuration of the network. The availability of this information may facilitate decisions about re-configurations of the mobile wireless communication system. A network planning system, not shown in FIGS. 1 and 3, may hold and supply up-to-date data about the configuration of the network. That information may include antenna pointing angles and locations of elements of the network infrastructure shown in FIG. 1, for example.

FIG. 4 shows the wide range of data that may be available for each call made in network 100. The first probe 160, second probe 165 and/or internal module 170 may extract all of the data shown in the table of FIG. 4, for each call taking place in at least two sectors of network 100.

Hundreds of millions of calls may take place in a large network every few days, so the amount of data generated is clearly very large. It is this problem that has lead to the alternative approaches 1-3 indicated in the background section.

Data stream 210 of FIGS. 2 and 3 may contain all of the data shown in the table of FIG. 4 for each call made in the network. However, high priority data steam 220 shown in FIG. 2 may contain only a few of the data items shown in FIG. 4. It is this selectivity that leads to the high priority data stream 220 containing significantly less data than data stream 210.

If data stream 210 is stored by the storage areas 350 shown in FIG. 3, then these storage areas will build up files of the general form shown in FIG. 4, for each call made in the mobile radio communications network 100.

Various practical embodiments of the invention are possible. The data prioritised into high priority data stream 220 from that available in FIG. 4 may comprise, for each communication session taking place in at least one geographical region of the mobile radio communications network, any combination of the following:
(i) Call set-up data;
(ii) Call close-down data;
(iii) Call data identifying the network nodes used;
(iv) Data identifying which radio bearer or radio bearers were involved in a call;
(v) Data identifying the type of call;
(vi) Data identifying the cell sites visible to the user device(s);
(vii) RCSP data for each communication session;
(viii) The IMSI of the mobile communication unit or units taking part.

In one practical embodiment, for each call made in a geographical region of the network 100 comprising at least two sectors, high priority data stream 220 may comprise:
(i) Call connection setup information and call closedown information;
(ii) Information concerning the radio links and/or the radio bearers involved in the call;
(iii) The type of call, e.g. voice or video;
(iv) Timing data concerning the cell sites visible to a user terminal;
(v) Received signal strength and/or signal-to-noise ratio for the call.

Figure 5:
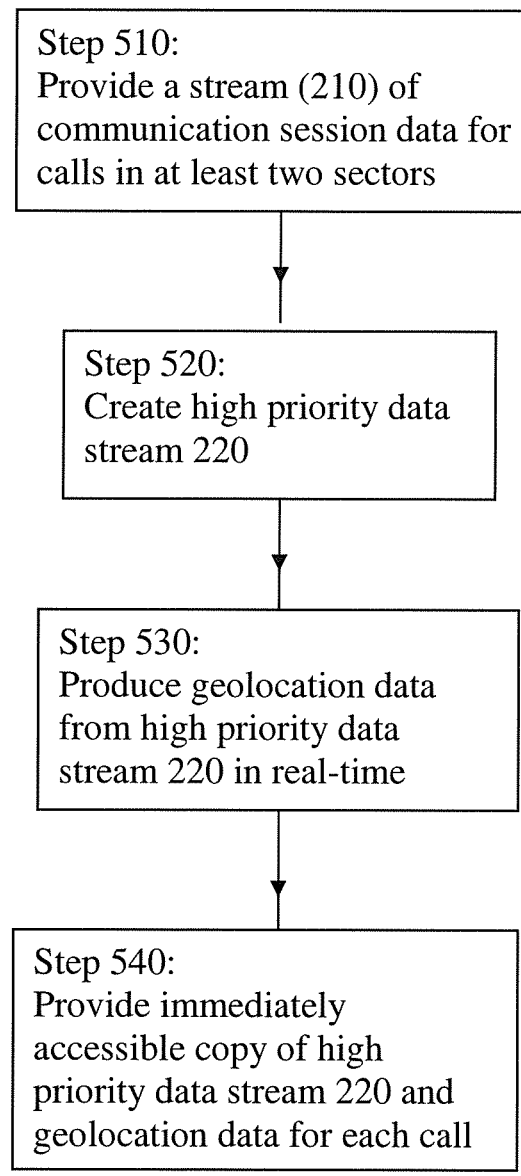
FIG. 5 illustrates a simplified flowchart of a specific method of an embodiment.

FIG. 5 provides a specific embodiment of the method 500 of the invention, for communication session data from a mobile radio communications network 100. Although the method is shown as steps, some of the steps occur simultaneously. The steps will continue indefinitely.

In step 510, substantially all communication session data relating to calls in at least two sectors of the mobile radio communications network is extracted. This happens as the communication session data becomes available, thereby providing a stream of communication session data 210.

Step 520 comprises creating a high priority data stream 220, from the stream of communication session data 210. The high priority data stream 220 comprises a minority of the communication session data, for each call in the at least two sectors of network 100.

Step 530 comprises processing the high priority data stream in real-time, to produce geolocation data 230 for each call in the at least two sectors of network 100.

Step 540 comprises providing an immediately accessible copy of both the high priority data stream and the geolocation data, for each call in the at least two sectors of network 100.

Figure 6:
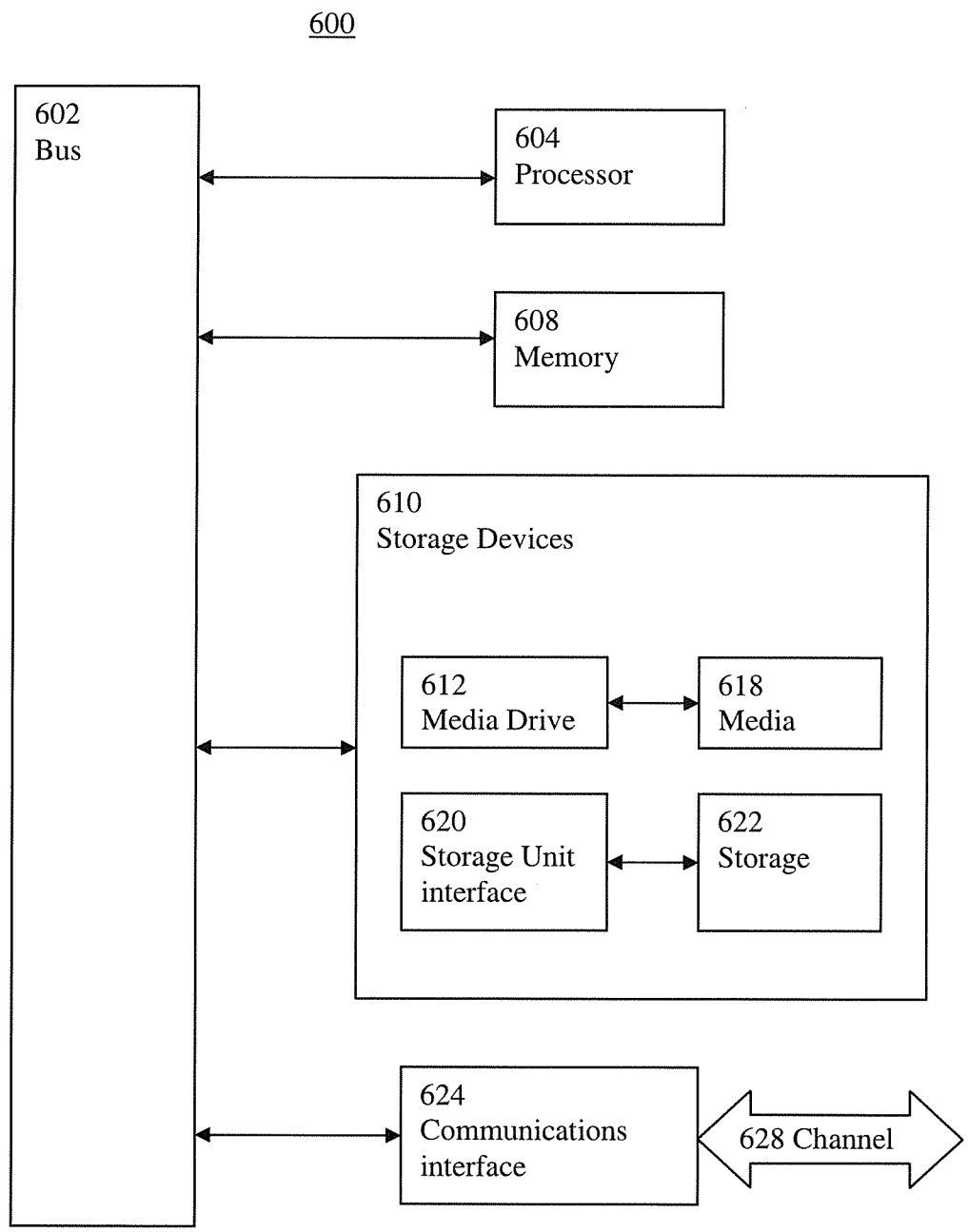
FIG. 6 illustrates a computing system that implement an embodiment of the invention.

Referring now to FIG. 6, there is illustrated a typical computing system 600 that may be employed to implement signal processing functionality in embodiments of the invention. Computing systems of this type may be used in access points and wireless communication units. Those skilled in the relevant art will also recognize how to implement the invention using other computer systems or architectures. Computing system 600 can include one or more processors, such as a processor 604. Processor 604 can be implemented using a general or special-purpose processing engine such as, for example, a microprocessor, microcontroller or other control module. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having particular computer software or data stored therein.

In the embodiment of FIG. 6, processor 604 may fulfill both the roles of:
(i) a data prioritisation module, operable to create a high priority data stream from the stream of communication session data, the high priority data stream comprising a minority of the communication session data for each call;
(ii) a data processing module, operable to process the high priority data stream in real-time, to produce geolocation data for each call, and to provide an immediately accessible copy of both the high priority data stream and the geolocation data for each call.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624.

These signals are provided to communications interface 624 via a channel 628. This channel 628 may carry signals and may be implemented using a wireless medium, wire or cable, fiber optics, or other communications medium. Some examples of a communication channel include a phone line, a cellular phone link, an RF link, a network interface, a local or wide area network, and other communications channels.

In this document, the terms 'computer program product' 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 622, drive 612 or communications interface 624. The control module (in this example, software instructions or computer program code), when executed by the processor 604, causes the processor 604 to perform the functions of the invention as described herein.

The inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

A computer-readable storage device may be provided with any of these signal processing circuits, having executable program code stored therein for programming signal processing logic to perform the method of the invention. The computer-readable storage device may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A method of processing communication session data from a mobile radio communications network, the method comprising:

extracting, by a device, communication session data relating to all calls in at least two sectors of the mobile radio communications network over a time period, as the communication session data becomes available, thereby providing a stream of communication session data, the communication session data including information identified based on a communication session between a first mobile communication unit and a second mobile communication unit;

creating, by the device and from the stream of communication session data, a high priority data stream comprising a minority of the communication session data, the high priority data stream including communication session data for each call included in the all calls in the at least two sectors of the mobile radio communications network over the time period;

processing, by the device, the high priority data stream to produce geolocation data for each call included in the all calls in the at least two sectors of the mobile radio communications network over the time period;

storing, by the device, the high priority data stream and the geolocation data, the high priority data stream and the geolocation data occupying less storage space than a storage space needed to store the communication session data; and deleting, by the device, the communication session data based on storing the high priority data stream and the geolocation data.

2. The method of claim 1, further comprising:
processing the high priority data stream to provide quality of service data for each call, included in the all calls, in the at least two sectors of the mobile radio communications network over the time period, and to provide an immediately accessible copy of the quality of service data.

3. The method of claim 1, wherein deleting the communication session data comprises:
deleting the communication session data after storing the high priority data stream.

4. The method of claim 1, wherein the communication session data comprises the extraction of substantially all of the communication session data from either:
a plurality of base stations of the mobile radio communications network;
a plurality of call processors of the mobile radio communications network,
a call processor, of the plurality of call processors, being in communication with at least one base station of the plurality of base stations; or
a master control processor of the mobile radio communications network,
the master control processor being in communication with the plurality of call processors.

5. The method of claim 1, wherein the high priority data stream includes call set-up data for each call taking place in the at least two sectors of the mobile radio communications network.

6. The method of claim 1, wherein the high priority data stream includes call close-down data for each call taking place in the at least two sectors of the mobile radio communications network.

7. The method of claim 1, wherein the high priority data stream includes call data identifying one or more network nodes used for each call taking place in the at least two sectors of the mobile radio communications network.

8. The method of claim 1, wherein the high priority data stream includes call data identifying one or more radio bearers used for each call session taking place in the at least two sectors of the mobile radio communications network.

9. The method of claim 1, wherein the high priority data stream includes call data identifying a type of call for each call taking place in the at least two sectors of the mobile radio communications network.

10. The method of claim 1, wherein the high priority data stream includes call data identifying one or more cell sites identifiable by the first mobile communication unit or the second mobile communication unit for at least one call taking place in the at least two sectors of the mobile radio communications network.

11. The method of claim 1, wherein the high priority data stream includes remote call service position (RCSP) data for each call taking place in the at least two sectors of the mobile radio communications network.

12. The method of claim 1, wherein the high priority data stream includes an International Mobile Subscriber Identity (IMSI) of the first mobile communication unit or the second mobile communication unit for at least one call taking place in the at least two sectors of the mobile radio communications network.

13. A device for processing communication session data from a mobile radio communications network, comprising:
one or more processors to:
extract communication session data relating to all calls in at least two sectors of the mobile radio communications network over a time period, as the communication session data becomes available, thereby providing a stream of communication session data,
the communication session data including information identified based on a communication session between a first mobile communication unit and a second mobile communication unit;
create a high priority data stream from the stream of communication session data,
the high priority data stream comprising a minority of the communication session data for each call included in the all calls in the at least two sectors of the mobile radio communications network over the time period;
process the high priority data stream to produce geolocation data for each call included in the all calls in the at least two sectors of the mobile radio communications network over the time period;
store the high priority data stream and the geolocation data,
the high priority data stream and the geolocation data occupying less storage space than a storage space needed to store the communication session data; and
delete the communication session data based on storing the high priority data stream and the geolocation data.

14. The device of claim 13, where the one or more processors are further to:
provide quality of service data for each call, of the all calls, in the at least two sectors of the mobile radio communications network over the time period; and
provide an immediately accessible copy of the quality of service data.

15. The device of claim 13, where the one or more processors, when deleting the communication session data, are to:
delete the communication session data after storing the high priority data stream.

16. The device of claim 13, where the communication session data includes at least one of:

call set-up data for the communication session between the first mobile communication unit and the second mobile communication unit;

call close-down data for the communication session between the first mobile communication unit and the second mobile communication unit;

information that identifies one or more network nodes used for the communication session between the first mobile communication unit and the second mobile communication unit;

information that identifies one or more radio bearers used for the communication session between the first mobile communication unit and the second mobile communication unit;

information that identifies a type of the communication session between the first mobile communication unit and the second mobile communication unit;

information that identifies one or more cell sites identifiable by the first mobile communication unit or the second mobile communication unit; or remote call service position (RSCP) data associated with the communication session between the first mobile communication unit and the second mobile communication unit.

17. A non-transitory computer readable medium storing instructions for processing communication session data from a mobile radio communications network, the instructions comprising:

one or more instructions that, when executed by one or more processors, cause the one or more processors to:

extract communication session data relating to all calls in at least two sectors of the mobile radio communications network over a time period, as the communication session data becomes available, thereby providing a stream of communication session data, the communication session data including information identified based on a communication session between a first mobile communication unit and a second mobile communication unit;

create a high priority data stream from the stream of communication session data, the high priority data stream comprising a minority of the communication session data for each call included in the all calls in the at least two sectors of the mobile radio communications network over the time period;

process the high priority data stream to produce geolocation data for each call included in the all calls in the at least two sectors of the mobile radio communications network over the time period;

store the high priority data stream and the geolocation data, the high priority data stream and the geolocation data occupying less storage space than a storage space needed to store the communication session data; and delete the communication session data based on storing the high priority data stream and the geolocation data.

18. The non-transitory computer readable medium of claim 17, where the communication session data includes communication session data received from at least one of:

a plurality of base stations associated with the mobile radio communications network;

a plurality of call processors associated with the mobile radio communications network, a call processor, of the plurality of call processors, being in communication with at least one base station of the plurality of base stations; or a master control processor associated with the mobile radio communications network, the master control processor being in communication with the plurality of call processors.

19. The non-transitory computer readable medium of claim 17, where the communication session data includes at least one of:

call set-up data for the communication session between the first mobile communication unit and the second mobile communication unit;

call close-down data for the communication session between the first mobile communication unit and the second mobile communication unit;

information that identifies one or more network nodes used for the communication session between the first mobile communication unit and the second mobile communication unit;

information that identifies one or more radio bearers used for the communication session between the first mobile communication unit and the second mobile communication unit;

information that identifies a type of the communication session between the first mobile communication unit and the second mobile communication unit;

information that identifies one or more cell sites identifiable by the first mobile communication unit or the second mobile communication unit; or remote call service position (RSCP) data associated with the communication session between the first mobile communication unit and the second mobile communication unit.

* * * * *